(12) United States Patent
Alaniz (10) Patent No.: US 7,677,068 B2
(45) Date of Patent: Mar. 16, 2010

(54) AIR BRAKE PLUNGER SECURING DEVICE

(75) Inventor: Carl B. Alaniz, Westlake Village, CA (US)

(73) Assignee: Heidi & Max LLC, Westlake Village, CA (US)

(*) Notice: Subject to any disclaimer, the term of this patent is extended or adjusted under 35 U.S.C. 154(b) by 59 days.

(21) Appl. No.: 12/114,190

(22) Filed: May 2, 2008

(65) Prior Publication Data

US 2009/0272157 A1 Nov. 5, 2009

(51) Int. Cl.
*F16K 35/10* (2006.01)
*B60R 25/08* (2006.01)

(52) U.S. Cl. ............................ 70/177; 70/164; 70/180; 303/89

(58) Field of Classification Search .................... 70/164, 70/175–180, 232; 303/89
See application file for complete search history.

(56) References Cited

U.S. PATENT DOCUMENTS

| | | | |
|---|---|---|---|
| 3,998,495 A * | 12/1976 | Maxwell et al. | 303/89 |
| 4,040,675 A * | 8/1977 | Richmond et al. | 303/89 |
| 4,697,444 A * | 10/1987 | Maffey | 70/232 |
| 4,779,433 A | 10/1988 | Legare | |
| 4,881,388 A | 11/1989 | Prium | |
| 5,214,945 A * | 6/1993 | Martin | 70/232 |
| 5,375,916 A | 12/1994 | Cook | |
| 5,511,399 A * | 4/1996 | Lynn | 70/233 |
| 5,560,233 A | 10/1996 | Watkins | |
| 5,688,027 A * | 11/1997 | Johnson | 303/89 |
| 5,735,147 A | 4/1998 | Cattanach et al. | |
| 5,813,256 A | 9/1998 | Hagen | |
| 6,606,887 B1 * | 8/2003 | Zimmer et al. | 70/232 |
| 6,634,195 B2 | 10/2003 | Lenz et al. | |
| 6,718,804 B1 | 4/2004 | Graves et al. | |
| 6,964,459 B2 | 11/2005 | Cormier | |

* cited by examiner

*Primary Examiner*—Peter M Cuomo
*Assistant Examiner*—Christopher Boswell
(74) *Attorney, Agent, or Firm*—Marc E. Hankin; Kevin Schraven; Hankin Patent Law, APC (57) ABSTRACT

The invention is an easy-to-use one-piece air brake securing device designed for use in recreational vehicles, trucks, and other automotive vehicles employing air-operated parking brakes. The device is designed to fit around the shaft of the air brake plunger and to prevent the plunger from being moved unintentionally or inadvertently in a manner that may disengage the air brake.

4 Claims, 6 Drawing Sheets

FIG. 6

AIR BRAKE PLUNGER SECURING DEVICE

FIELD OF INVENTION

The present invention relates generally to air brake securing devices. More specifically, it relates to an easy-to-use one-piece air brake securing device designed for use in recreational vehicles, trucks, and other automotive vehicles employing air-operated parking brakes. The device is designed to fit around the shaft of an air brake plunger and to prevent the plunger from being moved intentionally or inadvertently in a manner that may disengage the air brake.

BACKGROUND

The present invention relates to an air brake securing device designed for use in recreational vehicles, trucks, and other automotive vehicles. The present invention can also be used on any existing, or future, vehicle that has an air-operated parking brake plunger of the "push-pull" type. The present invention is placed around the air brake plunger and provides a physical impediment to the inadvertent or intentional movement of the air brake plunger. The present invention is designed to be used with off-the-shelf commercially available air brake plungers, and does not require modification of the air brake plunger or plunger knob.

In most recreational vehicles or trucks, air brakes are used to prevent the vehicle from moving by locking wheels of the vehicles. In most such vehicles, the air brakes are controlled by the driver and are mounted on the dashboard in the cab of the vehicle. Typically, the air brake is set or engaged by pulling the knob of the air brake plunger outward or away from the dashboard. The air brake is disengaged by pushing the knob inward or toward the dashboard.

In order to deter theft, and unwanted movement, it is desirable to provide an easy-to-use device to prevent the inadvertent or intentional disengagement of an air brake plunger knob after it has been pulled outward. While the air brake is set, theft or unwanted movement of the vehicle is virtually extremely difficult. Some prior references have generally addressed preventing the release of a set air brake plunger, but no product has solved the problem of providing a single-piece air brake plunger securing device that snaps easily on and off of the air brake plunger to reduce inadvertent or intentional disengagement thereof.

U.S. Pat. No. 5,560,233, issued to Watkins, discloses a locking device for an air brake plunger that consists of two parts. The Watkins reference shows a two-part shackle that is coupled together around the shaft of the plunger to prevent the movement of the air brake knob inward. Unlike the present invention, which needs only one part to effectively prevent air brake release, the two-part device of the reference depends upon the use of both pieces in order to be functional.

U.S. Pat. No. 5,813,256, issued to von Hagen, discloses a two-part locking device that is coupled together around the shaft of the knob to prevent moving the air brake knob inward. The von Hagen reference requires replacing the existing air brake plunger shaft with a new shaft. The new shaft has locking pins that engage the two-part locking device of the von Hagen reference. Unlike the present invention, which needs only one part to effectively prevent air brake release, the two-part device of the reference depends upon the use of both pieces in order to be functional.

U.S. Pat. No. 4,881,388, issued to Pruim, U.S. Pat. No. 4,779,433, issued to Legare, and U.S. Pat. No. 6,634,195, issued to Lenz et al., all disclose air brake locking devices that require the removal of the existing air brake plunger knob, and they use a lockable casing to prevent inadvertent inward movement of the air brake plunger. Unlike the present invention, which is designed to work with the air brake plunger knob that comes with the vehicle, and does not require the use of a lock to prevent inadvertent plunger movement, the air brake locks in the cited references require the removal of the existing air brake plunger knob, and depend upon a lockable casing to prevent unwanted movement of the plunger.

U.S. Pat. No. 5,375,916, issued to Cook, and U.S. Pat. No. 6,964,459, issued to Cormier, both disclose a two-piece device that locks over dual air brake plungers. The dual air brake plunger system is specific to a semi-tractor trailer truck. The first brake is for the truck itself and the second brake is for the trailer. The air brake locks of the cited references are distinguishable from the present invention because they are directed to a dual plunger system, and they require two pieces to effectively prevent unwanted movement of the plungers.

U.S. Pat. No. 5,735,147, issued to Cattanach et al., discloses an air brake locking apparatus that is mounted to the console and encloses two air brake plungers, one for the air brakes of the truck, and one for the air brakes of the trailer. Unlike the present invention, the Cattanach device must be permanently attached to the console in order to be functional. Also, unlike the present invention, the apparatus fully encloses the air brake plungers with a two part lock, in order to prevent unwanted movement of the plungers.

U.S. Pat. No. 6,718,804, issued to Graves et al., discloses a lockout device designed to interfere with the use of plungers or valves that require turning or rotating. The lockout device of the Graves reference substantially encases the valve and only prevents access to the valve if a second locking part is engaged to the first encasing part. The present invention is different because it does not substantially encase the plunger, and it only needs one piece to effectively prevent unwanted movement.

Thus, there remains a need in the art for a simple, easy-to-use one-piece, air brake plunger securing device.

SUMMARY OF THE INVENTION

Various embodiments of the invention are directed towards overcoming the above deficiencies of the prior art by providing an air brake plunger securing device that is easy-to-use and requires only a single-piece to prevent unwanted movement of an air brake plunger.

One embodiment of the present invention is a recreational vehicle air brake plunger securing device, comprising: a collar with an open end; a spring plunger; and a lock. The recreational vehicle air brake plunger securing device, wherein: the open end fits around a shaft of an air brake plunger; the open end is defined by two opposing sides; the collar fits between a bottom portion of a knob of the air brake plunger and a base of the air brake plunger when the air brake plunger is in an engaged position; the collar prevents the air brake plunger from being disengaged; the spring plunger is biased to extend into the open end of the collar to prevent the collar from being inadvertently removed from the air brake plunger; the collar has a plurality of holes that pass through the two opposing sides of the collar; optionally a lock may be passed through the plurality of holes to prevent the removal of the collar from the air brake plunger; and the plurality of holes align with an air brake plunger knob release pin, such that when the lock passes through the plurality of holes the air brake plunger knob release pin is not accessible.

One embodiment of the present invention is a truck air brake plunger securing device, comprising: a collar with an open end; a spring plunger; and a lock. The truck air brake plunger securing device, wherein: the open end fits around a shaft of an air brake plunger; the open end is defined by two opposing sides; the collar fits between a bottom portion of a knob of the air brake plunger and a base of the air brake plunger when the air brake plunger is in an engaged position; the collar prevents the air brake plunger from being disengaged; the spring plunger is biased to extend into the open end of the collar to prevent the collar from being inadvertently removed from the air brake plunger; the collar has a plurality of holes that pass through the two opposing sides of the collar; the lock passes through the plurality of holes to prevent the removal of the collar from the air brake plunger; and the plurality of holes align with an air brake plunger knob release pin, such that when the lock passes through the plurality of holes the air brake plunger knob release pin is not accessible.

One embodiment of the present invention is a vehicle air brake plunger securing device, comprising: a collar with an open end; a spring plunger; and a lock. The vehicle air brake plunger securing device, wherein: the open end fits around a shaft of an air brake plunger; the open end is defined by two opposing sides; the collar fits between a bottom portion of a knob of the air brake plunger and a base of the air brake plunger when the air brake plunger is in an engaged position; the collar prevents the air brake plunger from being disengaged; the spring plunger is biased to extend into the open end of the collar to prevent the collar from being inadvertently removed from the air brake plunger; the collar has a plurality of holes that pass through the two opposing sides of the collar; the lock passes through the plurality of holes to prevent the removal of the collar from the air brake plunger; and the plurality of holes align with an air brake plunger knob release pin, such that when the lock passes through the plurality of holes the air brake plunger knob release pin is not accessible.

In various embodiments of this invention, the one-piece collar is placed around the air brake plunger shaft after the shaft has been pulled outwardly to engage the air brakes. The collar is designed to fit tightly between the bottom surface of the brake plunger knob and the base of the air brake plunger, which is usually the dashboard or some other console in the vehicle. The collar provides a physical impediment to disengaging the air brake because the air brake plunger is prevented from moving inward.

In one embodiment of this invention, the lock is a standard elongated neck padlock or other similar rod or bar that can be inserted through the two holes in the opposite sides of the open end of the collar. If the lock is engaged with the collar when the collar is attached to the air brake plunger, the collar is not removable. Thus, not only is the vehicle safer from inadvertent movement, it is more protected from theft as well.

It is an object of the present invention to provide a one-piece, easy-to-use air brake plunger securing device that will overcome the deficiencies of the prior art.

It is another object of the present invention to provide a device that will prevent the intentional or inadvertent movement of the air brake plunger after the air brake plunger is in the engaged position.

The present invention is a significant improvement over the prior art because the prior art discloses devices that: are difficult to install; require significant time to install; require the replacement of parts, including such critical parts as the air brake plunger shaft and knob; and are two-piece designs that depend on the use of both pieces in order to effectively secure the air brake plunger. The present invention is easy-to-use, does not require the replacement or modification of any off-the-shelf or factory parts, and is a one-piece design that will encourage frequent use.

Other features and advantages are inherent in the invention claimed and will become apparent to those skilled in the art from the following detailed description and its accompanying drawings.

DETAILED DESCRIPTION OF THE DRAWINGS

In the following detailed description of the various embodiments of the invention, numerous specific details are set forth in order to provide a thorough understanding of various embodiments of the invention. However, one or more embodiments of the invention may be practiced without these specific details. In other instances, well-known methods, procedures, and/or components have not been described in detail so as not to unnecessarily obscure aspects of embodiments of the invention.

In the following detailed description of the various embodiments of the invention, reference is made to the accompanying drawings that form a part hereof, and in which is shown by way of illustration a specific embodiment in which the invention may be practiced. It is to be understood that other embodiments may be utilized and structural changes may be made without departing from the scope of the present invention. Accordingly, the drawings and detailed description are to be regarded as illustrative in nature and not restrictive. In addition, the reference or non-reference to a particular embodiment of the invention shall not be interpreted to limit the scope of the invention.

Figure 1:
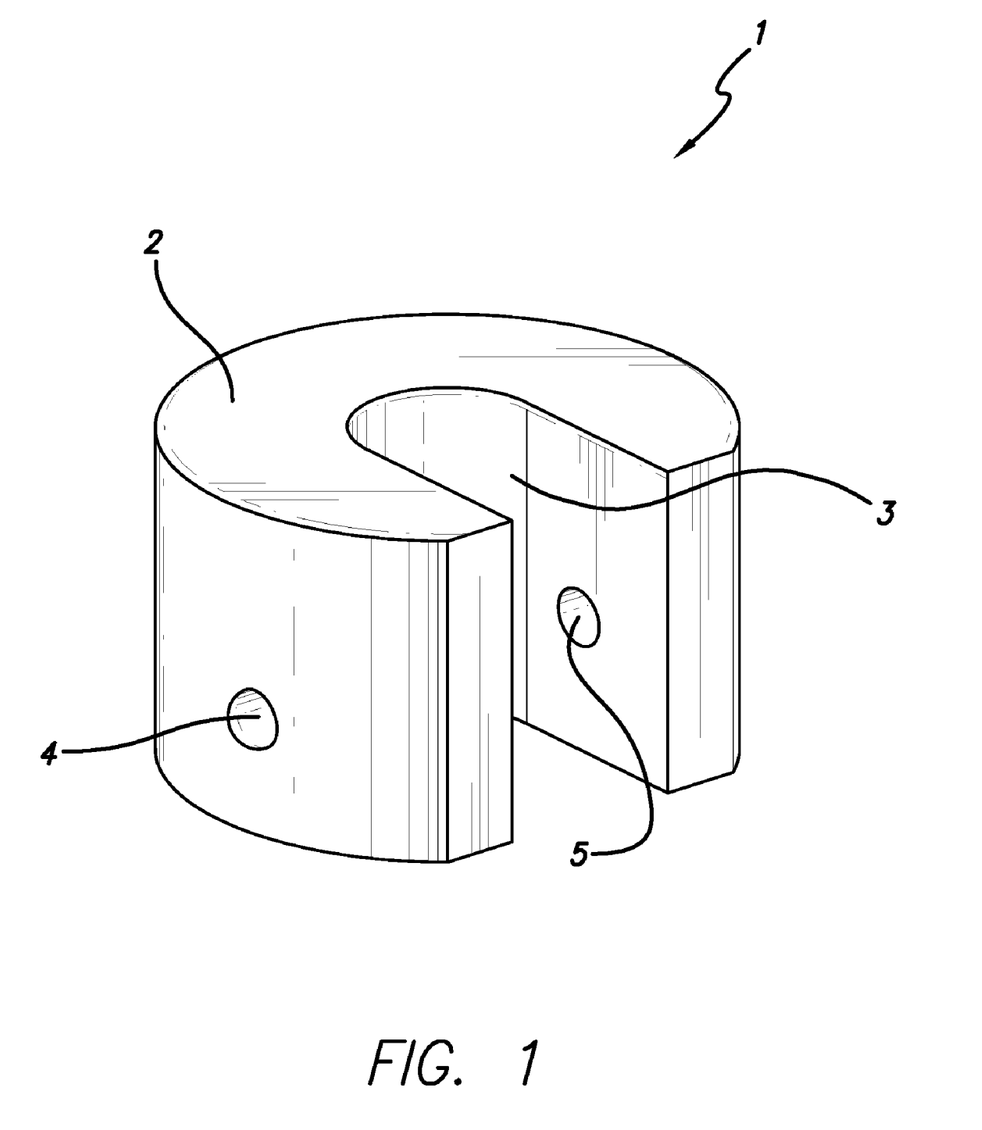
FIG. 1 is an illustration of a perspective view of the open end of one embodiment of the present invention.

FIG. 1 is an illustration of a perspective view of the open end of one embodiment of the present invention. As shown in FIG. 1 air brake plunger securing device 1 is preferably a semicircular, cylindrical, and solid collar 2. However, the collar 2 could take on any other geometric configuration, such as square or hexagonal, without departing from the scope of the present invention. The collar 2 is preferably made from aluminum, however, it should be understood that the collar 2 may be made of any other known and suitable natural or man-made material, or combination of materials, such as wood, composite materials, other metals, or plastic. Additionally, the collar 2 can be hollow, so long as the collar is strong enough to secure the air brake plunger, to resist tampering, and to sustain normal wear and tear. FIG. 1 shows that collar 2 preferably features an open end 3 for engaging with the air brake plunger of a recreational vehicle. For purposes of this invention, the term recreational vehicle refers to any larger size automotive vehicle that has an air brake or system of air brakes, and the term truck refers to any truck, tractor, or tractor trailer that has an air brake or system of air brakes.

FIG. 1 also shows that collar 2 preferably has holes 4 and 5 that allow the collar 2 to engage with a lock.

Figure 2:
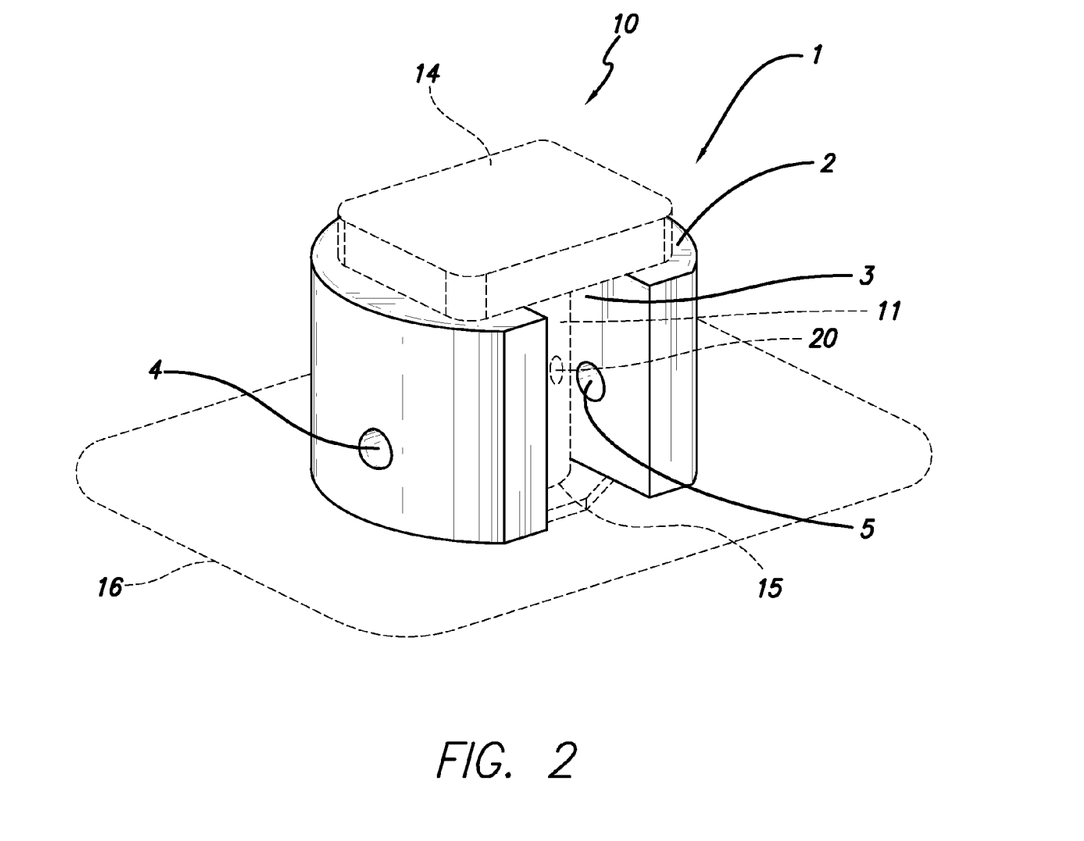
FIG. 2 is an illustration of a perspective view of the open end of one embodiment of the present invention engaged with an air brake plunger.

FIG. 2 is an illustration of a perspective view of the open end of one embodiment of the present invention engaged with an air brake plunger. Collar 2 of air brake plunger securing device 1, as shown in FIG. 2, preferably engages air brake plunger 10 by essentially surrounding the air brake plunger shaft 11. Collar 2 preferably circumscribes air brake plunger 10 such that three sides of air brake plunger shaft 11 are enclosed. Preferably, collar 2 engages with air brake plunger 10 after air brake plunger 10 has been pulled outwardly to the extended position to engage the air brake. The collar 2 preferably fits between the bottom surface of air brake plunger knob 14 and the base 15 of air brake plunger 10, such that air brake plunger 10 is prevented from being pushed inward and thus disengaging the air brake. Because air brake plunger knob 14 rests on the collar 2, air brake plunger 10 is prevented from being pushed toward base 15. As shown in FIG. 2, base 15 is usually flush with or slightly elevated from the dashboard 16 of the vehicle. Finally, FIG. 2 shows that the two holes 4 and 5 of the collar 2 are preferably aligned on an axis on opposite sides of the open end 3 and parallel to dashboard 16. The two holes 4 and 5 are also, preferably, aligned with the air brake plunger pin release 20.

Figure 3:
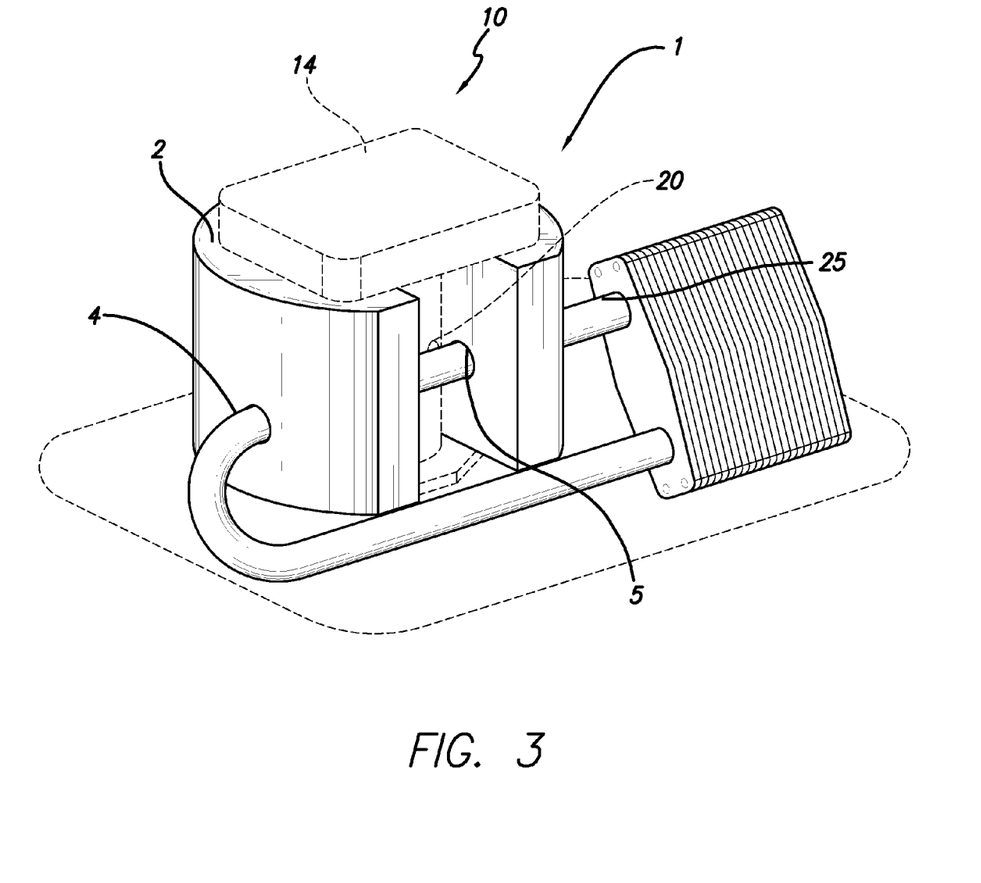
FIG. 3 is an illustration of a perspective view of the open end of one embodiment of the present invention engaged with an air brake plunger and shows the lock.

FIG. 3 is an illustration of a perspective view of the open end of one embodiment of the present invention engaged with an air brake plunger and shows the lock. As shown in FIG. 3, air brake plunger securing device 1 comprises the collar 2 and lock 25. Preferably, as shown in FIG. 3, lock 25 is a standard elongated keyed padlock type lock. However, lock 25 can be a combination lock, or any other type of locking device, rod or bar, without deviating from the scope of the invention. The importance of the lock is to prevent the collar 2 from being removed from air brake plunger 10. As shown in FIG. 3, lock 25 passes through holes 4 and 5. Additionally, when lock 25 is engaged with collar 2, air brake plunger knob release pin 20 is not accessible. Actuation of air brake plunger knob release pin 20 would enable the air brake plunger knob 14 to be removed and the air brake plunger 10 to be pushed inward releasing the air brake. This is why it is preferable that holes 4 and 5 align with air brake plunger knob release pin 20. When the collar 2 is engaged with air brake plunger 10, and lock 25 is engaged with the collar, the collar 2 is prevented from being removed from air brake plunger 10, and air brake plunger 10 is effectively prevented from being pushed inward.

Some vehicles are equipped with a plurality of air brake plungers. In the event that a vehicle has multiple air brake plungers, multiple air brake plunger securing devices of the present invention may be used in combination, physically combined, or physically and permanently connected to each other, to prevent inadvertent or intentional disengagement of one or more of the multiple air brake plungers. In addition, multiple air brake plunger securing devices of the present invention may be used wherein each air brake plunger securing device, or collar, has its own lock, or a single lock may be used in conjunction with two or more air brake plunger securing devices or collars, depending on the physical configuration and/or orientation of the vehicle's various air brake plungers. For example, if the vehicle has two air brake plungers that sit side by side on the dashboard, a user could snap two air brake plunger securing devices, or collars, onto the air brake plungers. Further, the two air brake plunger securing devices, or collars, could be permanently and physically connected to one another so that the collars may engage more easily with or disengage from the air brake plungers. Finally, if additional theft deterrence is desired, each of the two collars may be engaged with its own lock, or a single lock may be used to engage both collars simultaneously.

Figure 4:
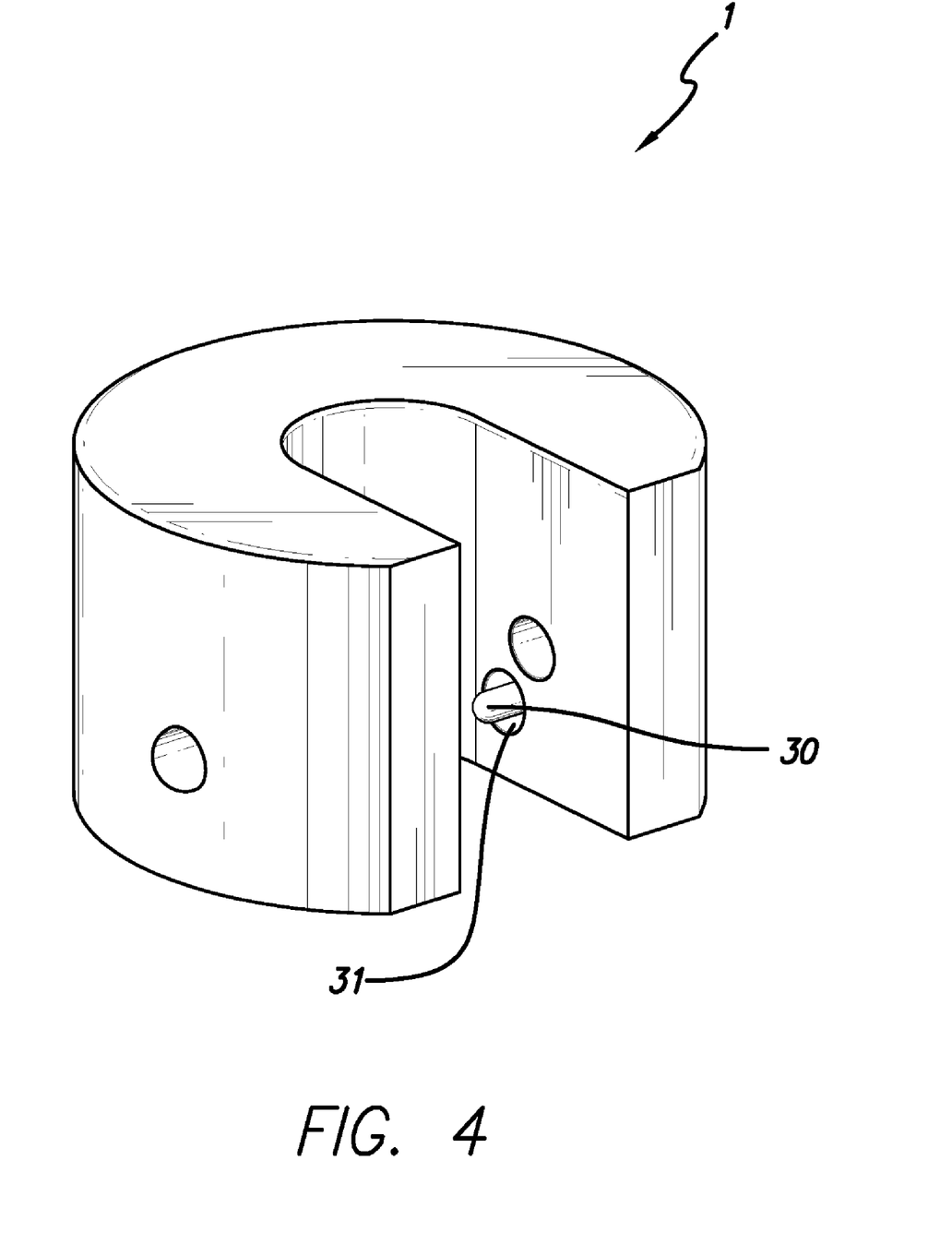
FIG. 4 is an illustration of a perspective view of the open end of one embodiment of the present invention and shows the spring plunger.

FIG. 4 is an illustration of a perspective view of the open end of one embodiment of the present invention and shows the spring plunger. As shown in FIG. 4, air brake plunger securing device 1 is comprised of collar 2 and spring plunger 30. Because spring plunger 30 is securely engaged with collar 2, they effectively make a single-piece air brake plunger securing device 1. As shown in FIG. 4, spring plunger 30 is preferably a round nose spring plunger. A round nose spring plunger allows the spring plunger to be depressed by applying force to the side of the spring plunger. The spring plunger slides into the collar 2 and is thus able to go around, or under, the object applying the lateral force. When the object is clear of the spring plunger, the spring plunger will rebound to its original position. Spring plunger 30 is able to recess into spring plunger hole 31 in response to an object applying lateral force. As shown in FIG. 4, preferably spring plunger 30 is biased toward the open end of collar 2.

Figure 5:
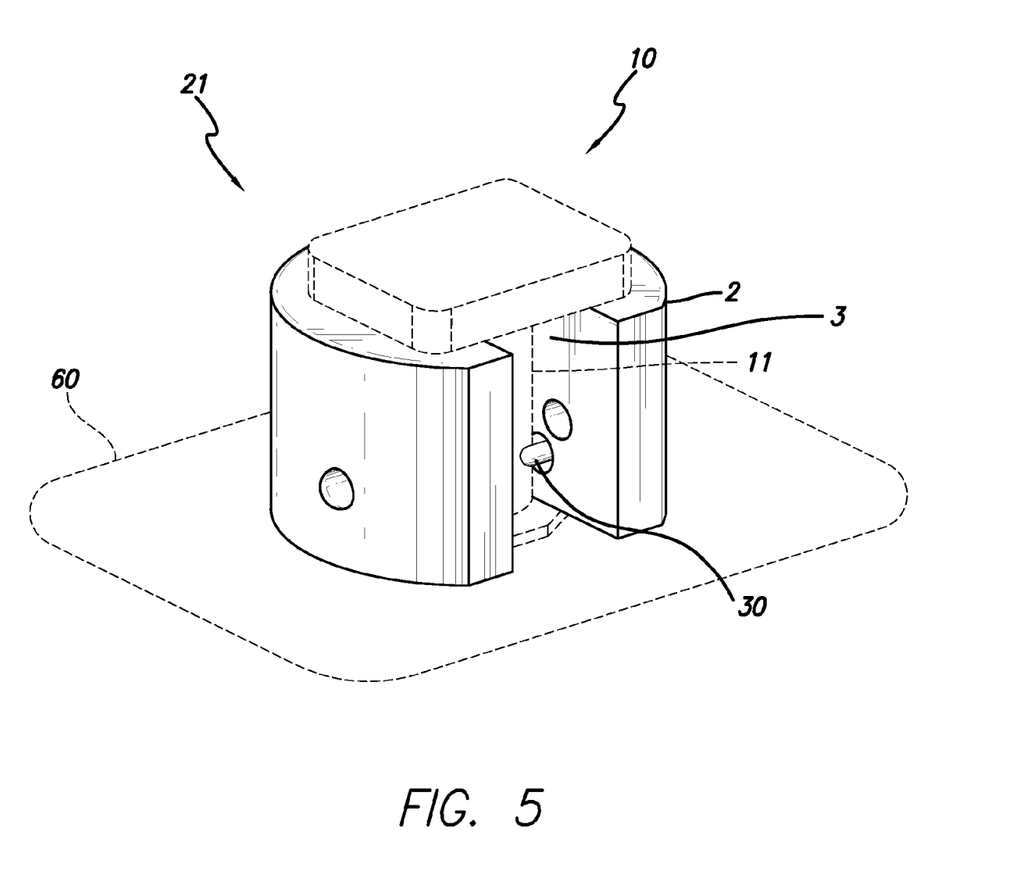
FIG. 5 is an illustration of a perspective view of the open end of one embodiment of the present invention engaged with an air brake plunger and shows the spring plunger.

FIG. 5 is an illustration of a perspective view of the open end of one embodiment of the present invention engaged with an air brake plunger and shows the spring plunger. As shown in FIG. 5, when the open end 3 of collar 2 engages the air brake plunger 10, spring plunger 30 is in a rebounded position and effectively keeps air brake plunger securing device 1 from becoming inadvertently disengaged from air brake plunger 10. Preferably spring plunger 30 is positioned on collar 2 so that air brake plunger shaft 11 can slide over, and by, spring plunger 30. Once the air brake plunger shaft 11 has passed by spring plunger 30, the air brake plunger shaft 11 of air brake plunger 10 comes to rest and is enclosed on three sides by open end 3. Spring plunger 30 then rebounds, and exerts the force of its spring to hold the air brake plunger 10 snuggly in place in the open end 3 of collar 2. Essentially, the spring plunger allows a user to snap the collar 2 onto the air brake plunger shaft 11, and then with the same amount of force, decouple the collar 2 from the air brake plunger shaft 11.

Figure 6:
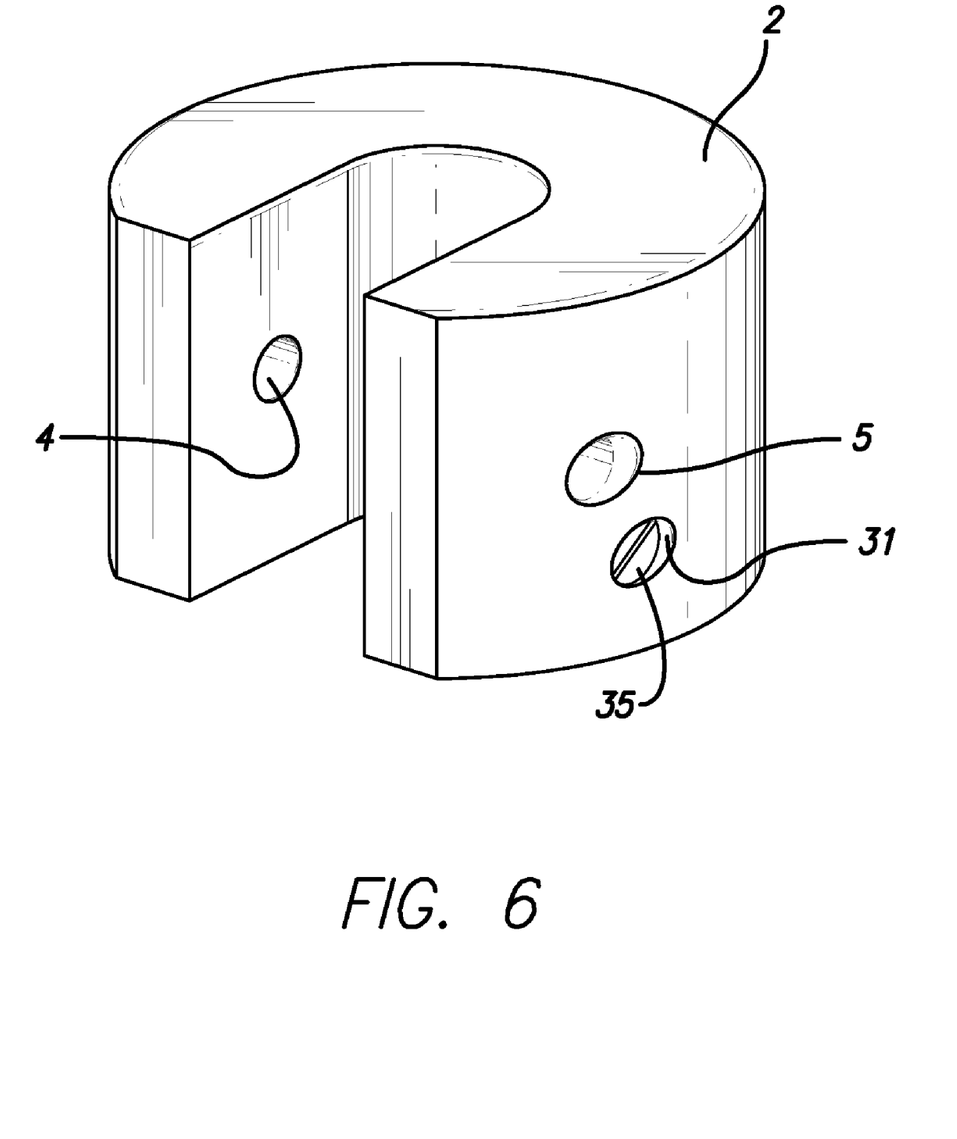
FIG. 6 is an illustration of a perspective view of the side and open end of one embodiment of the present invention.

FIG. 6 is an illustration of a perspective view of the side and open end of one embodiment of the present invention. As shown in FIG. 6, the bias of the spring plunger is adjustable by means of a screw 35 that is in spring plunger hole 31. As shown in FIG. 6, screw 35 is preferably flush or depressed from the outer surface of the collar 2. FIG. 6 also details how spring plunger hole 31 should be far enough away from holes 4 and 5, so that the lock and spring plunger will not interfere with each other.

What is claimed is:

1. A vehicle air brake plunger securing device, comprising:
   a collar; and
   a spring plunger;
   wherein said vehicle air brake plunger securing device attaches to a shaft of an air brake plunger;
   wherein said collar is a single unitary C-shaped piece with an outer collar surface and an inner collar surface;
   wherein said collar has an open end;
   wherein said open end is located at a connection between said inner collar surface and said outer collar surface;
   wherein said air brake plunger has an engaged position and a disengaged position;
   wherein said air brake plunger is further comprised of a base and a knob;
   wherein said knob is pulled outward to place said air brake plunger in said engaged position;
   wherein said open end of said collar matingly fits around a shaft of an engaged air brake plunger, wherein said inner surface of said collar substantially circumscribes said shaft of said engaged air brake plunger, wherein said collar fits between a bottom portion of said knob of said engaged air brake plunger and said base of said engaged air brake plunger without entombing said knob of said air brake plunger, and wherein said collar prevents said air brake plunger from disengaging wherein said spring plunger is comprised of a plunger tip and a plunger base;

wherein said spring plunger is substantially in an interior of said collar;

wherein said plunger tip extends into said open end, wherein said plunger tip is essentially perpendicular to said inner surface, and wherein said plunger tip prevents said collar from being inadvertently removed from said shaft of said air brake plunger; and wherein said plunger tip is retractable and allows said shaft of said air brake plunger to slip by when said vehicle air brake plunger securing device is purposefully attached or detached from said shaft of said air brake plunger.

2. The vehicle air brake plunger securing device according to claim 1, wherein said inner surface of said collar circumscribes at least three sides of said shaft of said engaged air brake plunger.

3. The vehicle air brake plunger securing device according to claim 2, further comprising:

a lock;

wherein said collar has a plurality of holes that pass though two opposing sides of said open end of said collar; and wherein said lock passes though said plurality of holes to prevent the removal of said collar from said air brake plunger.

4. The vehicle air brake plunger securing device according to claim 3, wherein said shaft of said air brake plunger further comprises a knob release pin, and wherein said plurality of holes are aligned with said knob release pin and prevent access to said know release pin when said lock is engaged with said plurality of holes.

* * * * *